Patented Feb. 23, 1932

1,846,926

UNITED STATES PATENT OFFICE

JAMES H. WERNTZ, OF WILMINGTON, DELAWARE, ASSIGNOR TO E. I. DU PONT DE NEMOURS & COMPANY, OF WILMINGTON, DELAWARE, A CORPORATION OF DELAWARE

STABILIZATION OF ORGANIC NITRATES

No Drawing.  Application filed November 20, 1930.  Serial No. 497,065.

This invention relates to a new process of stabilizing organic nitrates. More particularly the invention relates to the production of stable organic nitrates by a process which removes the unstabilizing effect of the impurities which are normally found in organic nitrogen compounds after the nitrating process.

Organic nitrates are usually prepared by treating organic compounds with nitric and sulfuric acids, either mixed or one at a time. As a result of this method of preparation, not only are traces of free acid usually retained by the compounds, but there are also retained certain unstable compounds formed by the reaction of the organic compound with one or both of the acids. Such unstabilizing impurities must be removed if a completely stable product is to be obtained. This removal is usually accomplished by washing the compound repeatedly with water or with water containing alkaline materials, or, in those cases in which it is very difficult to wash out the impurities, by dissolving the compound in a neutral solvent, neutralizing any free acid present, filtering from any insoluble impurities, then reprecipitating the compound.

This invention has as an object the production of stable organic nitrates by a simple, efficient, and inexpensive process.

These objects are accomplished by treating the organic nitrates with ethylene oxide.

In the application of my invention, an organic nitrate, for instance a crude organic nitrate, may be taken, given one or two washings with water to remove obvious excesses of acid, and may then be treated with ethylene oxide at a selected temperature. The treatment with ethylene oxide may be carried out at atmospheric pressure in an open or closed vessel or may be carried out at pressure greater than atmospheric in a closed vessel such as an autoclave. Ethylene oxide can be used in liquid form by maintaining the reaction temperature below the point of liquefaction of ethylene oxide. If it is desired to carry out the stabilizing process at temperatures above the liquefaction temperature of ethylene oxide, the process can be carried out by dissolving the organic nitrate in a suitable solvent and bubbling ethylene oxide gas through it. In general I have found that temperatures between $-10°$ C. and $+30°$ C. at atmospheric pressure give satisfactory results. Solid organic nitrates may be dissolved, if desired, in a suitable solvent, for instance in a solution composed of acetone and ethylene oxide, or in ethylene oxide alone. Since solid organic nitrates dissolve readily in relative small amounts of ethylene oxide, this procedure is simple and effective. It is sometimes advantageous to moisten the nitrate with water before dissolving.

After treatment of a dissolved organic nitrate with ethylene oxide, the nitrate may be precipitated from solution by the addition of water or other suitable non-solvents, filtered off, and dried. Before drying it may, if desired, be washed once or twice with water to remove the compounds which ethylene oxide forms with the impurities, but this is not essential. When the organic nitrate has been dissolved in ethylene oxide alone, it may be precipitated from the solution, or the ethylene oxide in excess of that required for stabilization may be evaporated at ordinary temperatures or by distillation at suitable pressure. The ethylene oxide excess may be recovered in either case.

Although I have not found the ethylene oxide reaction products deleterious to the stability of organic nitrates, it will be obvious that, should they be found disadvantageous in any particular instance, they can be removed by treating the stabilized nitrate with water, or with other suitable substances.

The following examples illustrate the production of various stable organic nitrates by the process of my invention. These examples are illustrative and not limitative.

Example I

A sample containing 2.5 g. of nitroglycerin which had been given a preliminary washing with water was mixed with 2.5 g. of ammonium nitrate. Another 2.5 g. sample from the same batch of nitroglycerin was mixed with 2.5 g. of ammonium nitrate and .125 g. of ethylene oxide. These samples were separately heated to 196° F. and the gas given off by the decomposition of nitroglycerin was collected in each instance. The sample which was not treated with ethylene oxide decomposed sufficiently in 20 hours to form a considerable quantity of gas. In the same period of time the treated sample gave off very much less gas, indicating a higher stability.

*Example II*

A 1 g. sample of mannitol hexanitrate was subjected to the Abel test which consists in heating a 1 g. sample of a nitrate at 65.5° C. in a test tube with a piece of starch-potassium iodide paper which has been wetted with a solution consisting of equal parts of water and glycerin. The appearance of a faint brown color on the paper indicates that the organic nitrate is decomposing. In this instance this faint brown color appeared in six minutes.

A 1 g. sample of the same mannitol hexanitrate was dissolved in ethylene oxide and the ethylene oxide was permitted to evaporate at room temperature. The treated mannitol hexanitrate was washed with water and dried in a desiccator over sulfuric acid. When subjected to the Abel test it gave a faint brown color in 30 minutes, indicating a stability five times that of the untreated sample.

A sample of mannitol hexanitrate which had been stabilized by repeated recrystallization had a stability very considerably less than that of the ethylene oxide-treated sample.

*Example III*

A sample of cellulose nitrate was taken directly from the nitrating bath, and washed with water until the wash water failed to redden blue litmus paper. A sample of this nitrocellulose was dissolved in acetone, neutralized with sodium bicarbonate and precipitated with water. The nitrocellulose was redissolved in acetone and the resulting solution divided into two parts, to one of which ethylene oxide was added. After 24 hours the nitrocellulose was precipitated by the addition of water, filtered off, and dried. The stability of the treated and untreated nitrocellulose as determined by the Abel test was 11 minutes and one minute, respectively.

*Example IV*

Two samples of glycol dinitrate were washed several times with water, were dried, and one of them was mixed with .5% of ethylene oxide. The treated and untreated samples were subjected to the Abel test and it was discovered that the untreated sample gave a test at the end of 18 minutes while the treated sample had not given a test at the end of 60 minutes.

In place of ethylene oxide, homologues and derivatives of ethylene oxide, such as styrene oxide, butylene oxide, and propylene oxide may be used, but ethylene oxide is preferred. The use of ethylene oxide is particularly advantageous because it is an excellent solvent for organic nitrates, because the presence of its reaction products in a stabilized organic nitrate does not appear deleteriously to affect stability, and because its use as a stabilizing agent produces nitrates having greatly increased stability to heat and to storage. Additional advantages of my process lie in its simplicity, and in the shorter time which it requires.

As many apparently widely different embodiments of this invention may be made without departing from the spirit and scope thereof, it is to be understood that I do not limit myself to the specific embodiments thereof except as defined in the appended claims.

I claim:

1. The step in the method of stabilizing an aliphatic organic nitrate comprising treating it with ethylene oxide.

2. The method of stabilizing an aliphatic organic nitrate comprising treating it with ethylene oxide.

3. The method of stabilizing an aliphatic organic nitrate comprising treating it with ethylene oxide and removing the ethylene oxide.

4. The method of stabilizing an aliphatic organic nitrate comprising adding ethylene oxide thereto and removing the ethylene oxide by evaporation.

5. The method of stabilizing an aliphatic organic nitrate comprising adding ethylene oxide thereto and removing the ethylene oxide by evaporation under reduced pressure.

6. The method of stabilizing an aliphatic organic nitrate comprising adding ethylene oxide thereto and removing the ethylene oxide and the ethylene oxide compounds.

7. The method of stabilizing an aliphatic organic nitrate comprising dissolving it in an inert solvent and treating it with ethylene oxide.

8. The method of stabilizing an aliphatic organic nitrate comprising moistening it, dissolving it an inert solvent, and treating it with ethylene oxide.

9. The method of stabilizing an aliphatic organic nitrate consisting in dissolving it in a solvent comprising ethylene oxide and acetone and removing the solvent.

10. The method of stabilizing a cellulose nitrate comprising dissolving it in an inert solvent and treating it with ethylene oxide.

11. The method of stabilizing a cellulose nitrate comprising dissolving it in an inert solvent, treating it with ethylene oxide, and removing the ethylene oxide.

12. The method of stabilizing an aliphatic organic nitrate comprising dissolving it in an inert solvent, treating it with ethylene oxide, and precipitating it from the solution.

13. The method of stabilizing a cellulose nitrate comprising dissolving it in ethylene oxide and removing the ethylene oxide.

14. The method of stabilizing mannitol hexanitrate comprising treating it with ethylene oxide.

15. The method of stabilizing glycol dinitrate comprising treating it with ethylene oxide.

In testimony whereof, I affix my signature.

JAMES H. WERNTZ.